United States Patent Office 3,067,142
Patented Dec. 4, 1962

3,067,142
EMULSION HYDRAULIC FLUID
Charles E. Francis, Martinez, Calif., assignor to Shell Oil Company, a corporation of Delaware
No Drawing. Filed Aug. 8, 1960, Ser. No. 47,895
7 Claims. (Cl. 252—75)

This invention relates to improved emulsion type hydraulic fluids. More particularly, this invention is directed to water-in-oil fire resistant hydraulic fluids which are stable and wear-resistant over a wide temperature and pressure range.

As suitable emulsion hydraulic fluids the art discloses emulsions which contain various soaps or salts or mixtures thereof. However, emulsions of this type have been found to be deficient in wear inhibition. To obviate this and to obtain a more improved hydraulic fluid and lubricant so-called wear inhibited emulsion hydraulic fluids have been developed which essentially comprise water-in-oil emulsions containing as emulsifiers metal sulfonates and/or metal phenates and as wear inhibitors water-soluble polymeric amides or water-miscible salts such as calcium nitrite, calcium acetate, or oil-miscible chlorohydrocarbon thiocarbonate esters. These materials although effective to a limited extent are not entirely satisfactory with respect to emulsion stability and in preventing wear where high temperatures and pressures are encountered in hydraulic systems.

It is an object of this invention to provide an emulsion fire-resistant hydraulic fluid having good stability and wear resistant properties. Another object is to provide a water-in-oil hydraulic fluid emulsion which is noncorrosive, stable and inhibits wear under higher temperature and pressure conditions. Still another object of this invention is to provide a water-in-oil emulsion hydraulic fluid having good lubricating properties and which is not detrimental to metallic and non-metallic parts of the hydraulic system.

These and other objects are accomplished in accordance with this invention by providing a water-in-oil emulsion which is from about 20 to about 45% water phase and from about 55% to about 80% oil phase, the emulsion containing a combination of minor amounts (0.1–1.2% each, preferably 0.1–5.0% each) of three essential additives, namely (1) an oil-soluble basic alkaline earth metal aromatic carboxylate, (2) an oil-soluble basic alkaline earth metal organic sulfonate, and (3) a mixture of (A) an organic sulfide having the formula

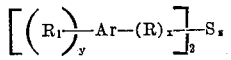

where Ar is a mono or polynuclear aromatic, R is an alkylene radical, preferably a methylene or ethylene radical, $R_1$ is a $C_{1-18}$, preferably $C_{5-10}$, alkyl or cycloalkyl radical or a polar radical such as a halogen, hydroxyl or amine group, $x$ is an integer from zero to 1, $y$ is an integer from zero to 2 and $z$ is an integer from 1 to 4, preferably 1 to 2 and (B) a partial ester of an alkanepolyol and a $C_{12-18}$ saturated or unsaturated fatty acid. The surprising discovery resides in the fact that although organic sulfides in oil mediums are known to impart extreme pressure properties their antiwear inhibiting properties in emulsons have not been previously noted and that this property is accentuated when in the presence of a partial ester as defined, which normally possess no antiwear inhibiting properties in either oil or emulsion mediums.

The oil-soluble basic alkaline earth metal aromatic carboxylates of the group II metals of the periodic table having an atomic number of from 12 to 56, inclusive, and preferably the alkaline earth metals, include such compounds as basic calcium, barium, magnesium, strontium and zinc salts of hydrocarbon substituted benzoic, salicylic, resorcylic, anthranilic and naphthoic acids such as the basic calcium, barium, magnesium and/or zinc salts of $C_3$–$C_{22}$-alkylbenzoic, $C_8$–$C_{22}$-alkylsalicylic, $C_3$–$C_{22}$-alkylnaphthoic acids and mixtures thereof.

The preferred salts are the basic barium and calcium salts of laurylsalicylic acid, or of stearylsalicylic acid or of a mixture of alkylsalicylic acids in which the alkyl groups contain from 8 to 30, preferably 14 to 22, carbon atoms. The basic calcium salts of these alkylsalicylic acids are particularly preferred. The highly basic salts may be prepared, for example, by the process described in U.S. Patents 2,409,687 or 2,616,910.

The sulfonates are oil-soluble basic alkaline metal organic sulfonates of which calcium and barium petroleum sulfonates are preferred. Suitable sulfonates include the basic calcium, barium and magnesium petroleum sulfonates of oil-soluble petroleum sulfonic acids. The acids should range in molecular weight of from about 350 to 550 and preferably are in the range of from 400 to 500. Other sulfonates include the oil-soluble basic calcium, barium and magnesium tetratertiarybutylnaphthalene sulfonates, dinonyl naphthalene sulfonates, diwaxbenzene sulfonates, waxphenol sulfonates and mixtures thereof.

By a basic salt as used with reference to the aromatic carboxylates and the sulfonates is meant that the amount of metal neutralizing agent, e.g. metal oxide, metal hydroxide, or metal carbonate, used is in excess of that stoichiometrically required to neutralize the carboxylic or sulfonic acid to produce the normal salt. The excess basicity of the salts used in compositions of this invention should be from 25% to 1000% and preferably from about 50 to 800%.

The organic sulfides having the formula

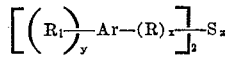

as defined above, and preferably having the formula

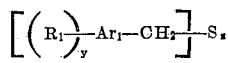

where $Ar_1$ is benzene, $R_1$ is chlorine or an —OH group, $y$ is zero or 1 and $z$ is 1 or 2, preferably 2 and include diphenyl mono and disulfides, dicresyl mono and disulfides, dinaphthyl mono and disulfides, dibenzyl mono and disulfides, diphenyl diethyl disulfide, dimethyl dibenzyl disulfide, dimethyl benzyl di, tri, tetra and pentasulfides, dichlorodibenzyl disulfide, hydroxybenzyl disulfide, chlorodinaphthyl disulfide, and mixtures thereof, of which preferred are dibenzyl disulfide and dichlorodibenzyl disulfide.

The partial esters of alkanepolyol and fatty acids in compositions of the present invention function as stabilizers and activators of the organic sulfides as antiwear agents. The alkanepolyols include alkylene glycols e.g. ethylene or propylene glycol, glycerol, erythritol, pentaerythritol, sorbitol, mannitol and the like. The acids which can be used to make the partial esters from any of the above alcohols include saturated and unsaturated fatty acids of from 12 to 18 carbon atoms, such as lauric, myristic, stearic, oleic, linoleic, linolenic and ricinoleic acids. These partial esters are used in an amount of from 0.25% to about 3%, preferably from about .5% to about 1.5% by weight.

Specific esters derived from simple alkanepolyols and long chain fatty acids include glycerol monooleate, glycerol monostearate, glycerol monoricinoleate, pentaerythritol mono- and dilaurate, pentaerythritol mono- and distearate, mono-, di- and triethylene glycol monoleate, propylene glycol monoricinoleate, ethylene glycol monooleate, triethylene glycol monostearate, sorbitol monolaurate, mannitol monooleate, mannitol dioleate, sorbitol dioleate, etc.

A finished emulsion fluid (composition A) of the invention was prepared by slowly adding 40% water to a vessel containing 1.2% each of oil-soluble basic calcium petroleum sulfonate (180% excess base) and oil-soluble basic calcium $C_{18-22}$ alkyl salicylate (200% excess base), 0.3% dibenzyl disulfide and 0.6% glycerol monooleate, dispersed in 56.7% mineral oil of 100 SUS at 100° F. The entire mixture was passed through a colloid mill where it was agitated until a homogeneous emulsion was formed.

Other compositions which illustrate emulsions of this invention are—

Composition B:

| | Percent weight additive in total emulsion |
|---|---|
| Basic Ca petroleum sulfonate (180% excess base) | 1.20 |
| Basic Ca $C_{18-22}$ alkyl salicylate (200% excess base) | 1.20 |
| 2,6-ditert.butyl-4-methylphenol | 0.30 |
| Phenyl-alpha-naphthylamine | 0.06 |
| Dibenzyldisulfide | 0.30 |
| Glycerol monooleate | 0.60 |
| Yellow dye (Sandoz Chem. Co.) | 0.018 |
| Mineral oil (100 SUS 100° F.) | 50.322 |
| Water | Balance |

Composition C:

| | |
|---|---|
| Basic Ca petroleum sulfonate (180% excess base) | 1.20 |
| Basic Ca $C_{18-22}$ alkyl salicylate (50% excess base) | 1.20 |
| 3,5-ditert.butyl-4-hydroxybenzyl alcohol | 0.30 |
| Phenyl-alpha-naphthylamine | 0.06 |
| Dibenzyldisulfide | 0.30 |
| Glycerol monooleate | 0.60 |
| Yellow dye (Sandoz Chem. Co.) | 0.018 |
| Mineral oil (100 SUS 100° F.) | 56.322 |
| Water | Balance |

Composition D:

| | |
|---|---|
| Basic Ba petroleum sulfonate (50% excess base) | 2 |
| Basic Ba cetyl salicylate (25% excess base) | 2 |
| Dibenzyldisulfide | 1 |
| Sorbitan monooleate | 0.5 |
| Mineral oil (100 SUS at 100° F.) | 54.5 |
| Water | 40 |

Composition E:

| | |
|---|---|
| Basic Ca dinonylnaphthalene sulfonate (50% excess base) | 3 |
| Basic Ca diwax benzoate | 2 |
| Dinaphthyldisulfide | 0.5 |
| Glycerol monostearate | 1.0 |
| Mineral oil (100 SUS 100° F.) | 53.5 |
| Water | 40 |

The outstanding properties which compositions of this invention possess with respect to wear inhibitor and emulsion stability are shown in Table I. The anti-wear properties were determined using a Vickers vane pump (Model V-104-A) by circulating the test fluid under conditions indicated in Table I and the emulsion stability of the used fluid was determined by measuring the amount of water and oil separation after storage at 140° F.

Table I

| Composition | B | | I[1] | | II[2] | | III[3] | | IV[4] | |
|---|---|---|---|---|---|---|---|---|---|---|
| Emulsion Stability at 140° F. | Oil | Water | Oil | Water | Oil | Water | Oil | Water | Oil | Water |
| Separation, percent vol. (after operating period of 700 hrs.) after 20 days storage | 12 | slight | 13 | slight | 14 | slight | 50 | slight | Complete separation | |
| Pump Wear Test: Total wear of vane and ring combined, gms./1,000 hrs, 1,000-1,800 p.s.i. | 0.18 | | 2.90 | | | | failed | | failed | |

Composition I[1]—(1.2% basic Ca petroleum sulfonate +1.2% basic Ca $C_{18-22}$ alkyl salicylate +0.3% "Santopoid S" +56.922% mineral oil +40% water +0.3% 2,6-ditert.butyl-4-methylphenol +0.06% phenyl-alpha-naphthylamine +0.018% Yellow Dye).

Composition II[2]—(1.2% basic Ca petroleum sulfonate +1.2% basic Ca $C_{18-22}$ alkyl salicylate +0.3% dibenzyldisulfide +0.3% 2,6-ditert.butyl-4-methylphenol +0.06% phenyl-alpha-naphthylamine +56.922% mineral oil +40% water +0.018% Yellow Dye).

Composition III[3]—(57.222% mineral oil (100 SUS at 100° F.) +1.2% basic calcium petroleum sulfonate +1.2% basic calcium $C_{18-22}$ alkyl salicylate +0.3% 2,6-ditert.butyl-4-methyl phenol +0.06% phenyl-alpha-naphthylamine +0.018% Yellow Dye +40% water).

Composition IV[4]—(54% mineral oil +1.2% basic calcium petroleum sulfanate +1.2% basic calcium $C_{18-22}$ alkyl salicylate +0.3% 2,6-ditert.butyl-4-methylphenol +0.06% phenyl-alpha-naphthylamine +3% Zn alkyl dithiophosphate +0.018% Yellow Dye +40% water).

The omission of glycerol monooleate from composition B or the substitution in composition B of other esters such as methyl oleate or tricresylphospate results in compositions of poor stability and wear inhibition. Also the omission of dibenzyl disulfide from composition B results in excess wear of hydraulic systems.

Compositions of this invention are particularly suitable for use in diesel engines, in die casting machines, in permanent mold machines in steel mill equipment such as coke pushers, pipe coupling tighteners, combustion control mechanisms, plastic molding presses and glass blowing machines, and the like.

I claim as my invention:

1. A hydraulic fluid consisting essentially of a water-in-mineral oil emulsion in which the water phase constitutes from about 20% to about 45% of the emulsion and the oil phase is from about 55% to 80%, the oil phase being essentially a mineral oil containing from about 0.1% to about 12% by weight each of an oil-soluble basic alkaline earth metal hydrocarbon sulfonate and an oil-soluble basic alkaline earth metal salt of an alkyl substituted aromatic acid and from about 0.1% to about 5% by weight each of an organic sulfide represented by the formula

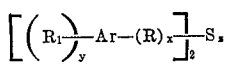

where Ar is an aromatic radical selected from the group consisting of mono- and diaromatic radicals, R is an alkylene radical selected from the group consisting of methylene and ethylene radicals, $R_1$ is a radical selected from the group consisting of $C_{1-18}$ alkyl, halogen, hydroxyl and amino groups, $x$ is an integer of 0 and 1, $y$ is an integer of from 0 to 2 and $z$ is an integer of from 1 to 4, and a partial ester of an alkanepolyol containing from 2 to 6 hydroxyl groups and a fatty acid having from 12 to 18 carbon atoms.

2. A hydraulic fluid consisting essentially of a water-in-mineral oil emulsion in which the water phase constitutes from about 20% to about 45% of the emulsion and the oil phase is from about 55% to about 80%, the oil phase being essentially a mineral oil containing from about 0.5% to about 12% by weight each of an oil-soluble basic calcium petroleum sulfonate and an oil-soluble basic calcium $C_{18-22}$ alkyl salicylate and from about 0.1% to about 5% by weight each of an aryl sulfide represented by the formula

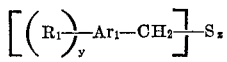

where $Ar_1$ is benzene, $R_1$ is a polar group selected from the group consisting of chlorine and hydroxyl radicals, $y$ is an integer of from 0 and 1 and $z$ is an integer of from 1 to 2, and a partial ester of an alkanepolyol selected from the group consisting of glycerol and sorbitan and a long chain unsaturated fatty acid having from 12 to 18 carbon atoms.

3. A hydraulic fluid consisting essentially of a water-in-mineral oil emulsion in which the water phase constitutes from about 20% to about 45% of the emulsion and the oil phase is from about 55% to about 80%, the oil phase being essentially a mineral oil containing from about 0.5% to about 12% by weight each of an oil-soluble basic calcium petroleum sulfonate and an oil-soluble basic calcium $C_{18-22}$ alkyl salicylate and from about 0.1% to about 5% by weight each of a dibenzyldisulfide and a partial ester of an alkanepolyol selected from the group consisting of glycerol and sorbitan and a long chain unsaturated fatty acid having from 12 to 18 carbon atoms.

4. A hydraulic fluid consisting essentially of a water-in-mineral oil emulsion in which the water phase constitutes from about 20% to about 45% of the emulsion and the oil phase is from about 55% to about 80%, the oil phase being essentially a mineral oil containing from about 0.5% to about 12% by weight each of an oil-soluble basic calcium petroleum sulfonate and an oil-soluble basic calcium $C_{18-22}$ alkyl salicylate and from about 0.1% to about 5% by weight each of dibenzyl disulfide and a glycerol monooleate.

5. A water-in-mineral oil hydraulic fluid in which the water phase constitutes about 40% of the emulsion and the oil phase is about 60% of the emulsion, said emulsion containing about 2–4% by weight each of oil soluble basic calcium petroleum sulfonate and oil soluble basic calcium $C_{18-22}$ alkyl salicylate and 0.1% to 5% by weight each of glycerol monooleate and dibenzyldisulfide.

6. The hydraulic fluid composition of claim 5 containing in the emulsion from about 0.05% to about 1% by weight of an oil-soluble alkylphenol and an oil-soluble aromatic amine.

7. The hydraulic fluid composition of claim 5 containing in the emulsion from about 0.05% to about 1% by weight of 2,6-di-tertiary butyl-4-methylphenol and phenyl-alpha-naphthylamine.

References Cited in the file of this patent

UNITED STATES PATENTS

| | | |
|---|---|---|
| 2,848,416 | Gililland et al. | Aug. 19, 1959 |
| 2,907,714 | Francis et al. | Oct. 6, 1959 |
| 2,941,945 | Fainman et al. | June 21, 1960 |
| 2,965,574 | Tierney et al. | Dec. 20, 1960 |

FOREIGN PATENTS

| | | |
|---|---|---|
| 210,095 | Australia | Aug. 14, 1957 |